Oct. 27, 1970     V. E. PALMER     3,536,336
PORTABLE ROTARY ACCUMULATION RECEPTACLE
Filed Aug. 5, 1968
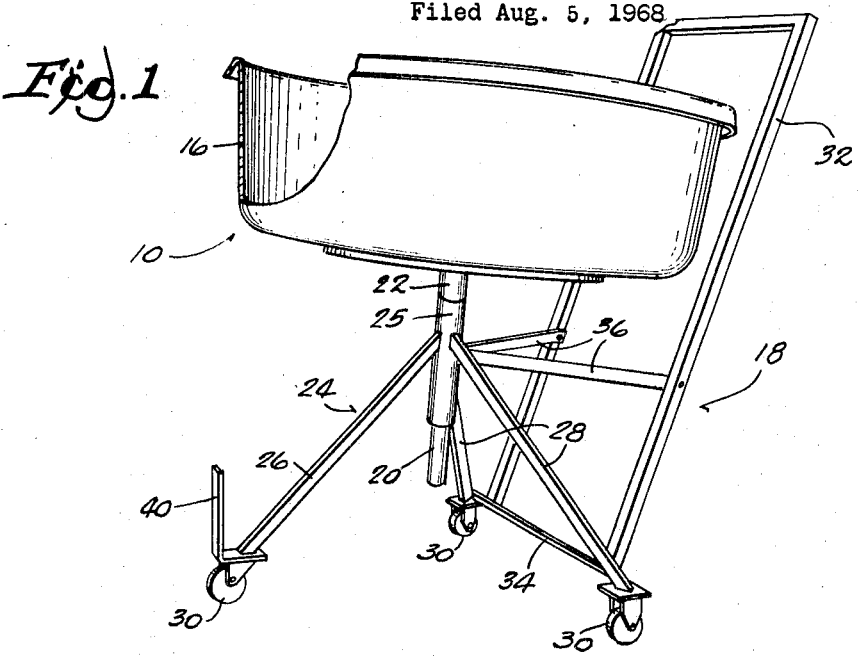
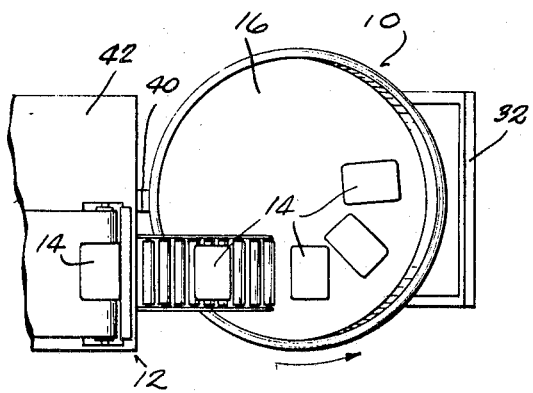
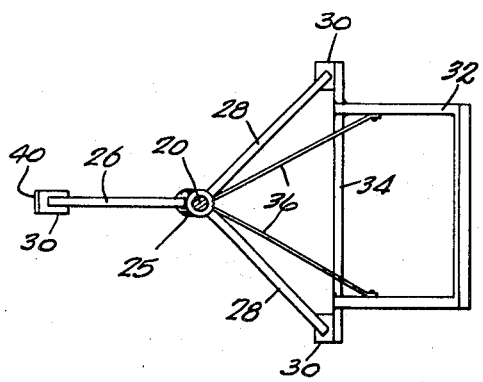
INVENTOR
VICTOR E. PALMER
BY Wheeler, Wheeler, House & Clemency
ATTORNEYS United States Patent Office 3,536,336
Patented Oct. 27, 1970

3,536,336
PORTABLE ROTARY ACCUMULATION RECEPTACLE
Victor E. Palmer, Greendale, Wis., assignor to Wrapping Machinery Company, Inc., Franksville, Wis., a corporation of Wisconsin
Filed Aug. 5, 1968, Ser. No. 750,088
Int. Cl. B62b *11/00*
U.S. Cl. 280—47.34                              2 Claims

ABSTRACT OF THE DISCLOSURE

Disclosed herein is a portable rotary accumulator having a receptacle supported for rotation at an angle to the horizontal on a wheeled carriage with a handle on the carriage extending at a slant upwardly and outwardly from the receptacle and a bumper guard on the carriage located forwardly of the receptacle.

BACKGROUND OF THE INVENTION

Rotary accumulators are used to automatically distribute articles or packages about the accumulator receptacle as the packages are discharged from a conveyor. This type of accumulator has the receptacle mounted at an angle, with the high side of the receptacle positioned to receive the articles. As articles drop from a conveyor onto the high side of the receptacle, the weight of the articles will upset the balance of the receptacle causing it to rotate so that subsequent articles are dropped onto different parts of the receptacle and thereby automatically distributes the articles throughout the receptacle. These accumulators are commonly located in a fixed position relative to the conveyor and articles accumulated in the receptacle generally have to be removed from the receptacle and transported by hand.

SUMMARY OF THE INVENTION

The invention disclosed herein provides a wheeled carriage for moving such a rotary type accumulator from a loading station to an unloading station. A handle on the base is slanted upwardly and outwardly to aid in moving the accumulator as well as lifting the receptacle over obstructions. The receptacle is protected from damage through impact with obstructions and is properly spaced from the loading station by a bumper provided on the base forwardly of the receptacle.

Other objects and advantages will become more apparent from the following detailed description when read in connection with the accompanying drawing, in which:

FIG. 1 is a perspective view of the portable rotary accumulator.

FIG. 2 is a top view of the portable accumulator positioned at the discharge end of a conveyor.

FIG. 3 is a top view of the carriage for the portable accumulator with the receptacle removed.

DESCRIPTION OF THE PERFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to the drawings, a portable rotary accumulator 10 is shown which is adapted to be moved to a position adjacent a loading station such as conveyor 12 to receive and automatically distribute articles or packages 14 discharged from the conveyor 12. The conveyor 12 is typically the discharge element of an automatic labeling machine as shown in U.S. Pat. 3,264,161. Accumulator 10 includes a receptacle 16 supported at an angle to the horizontal by a carriage 18. The high side of the receptacle 16 is positioned next to the conveyor 12 so that articles 14 dropped onto the outside margin of the receptable will cause the receptacle to rotate by gravity, as seen in FIG. 2. The articles will then be evenly distributed throughout the receptacle 16.

The circular receptacle 16 is supported on the carriage 18 by means of a downwardly extending center post or rod 20 located on the axis of the receptacle 16, positioned in a tubular housing 25 on the carriage with the weight of the receptacle balanced on the center post 20. The receptacle 16 is balanced on the center post 20 so that articles deposited on the high side of the receptacle will upset the balance of the receptacle causing the receptacle to rotate. A shoulder or bearing 22 may be provided on the center post 20 beneath the receptacle 16 to adjust the height of the receptacle.

Means are provided for moving the carriage 18 to transport the accumulator from a loading station to an unloading station; for example, from the discharge end of conveyor 12 to a display case to which the articles 14 are to be transferred. Although various means can be employed, in the embodiment shown in the drawings this means includes a moveable tripod base 24 formed by a forward leg 26 and a pair of rear legs 28 secured to the tubular housing 25. Each of the legs 26 and 28 extends downwardly and outwardly from the tubular housing 25 and a wheel or caster 30 is provided at the end of each of the legs 26 and 28. The tubular housing 25 is supported at the appex formed at the upper end of the legs 26 and 28 and is angularly inclined from a vertical line passing through the apex of the legs. The tubular housing 25 desirably lies in a vertical plane passing through the front leg 26 so that the high side of the accumulator is located over the front leg 26.

Means are provided to aid in manipulating the carriage during its movement, this means is especially designed to aid in moving and raising the legs over obstructions in the path of the carriage. This means includes a handle 32 which extends at a slant upwardly and outwardly from the base 24. More specifically, the handle 32 is secured to a cross brace or stretcher 34 provided between the lower end of the rear legs 28 and to the housing 20 by means of a pair of struts 36. The handle 32 is disposed at an upward slant to provide a mechanical advantage in lifting the caster 30 on the front leg 26 off of the ground to clear obstructions in the path of the carriage, for example the threshold of a doorway through which the accumulator is to be wheeled. In this regard, the casters 30 on the rear legs 28 act as a fulcrum when the handle 32 is pulled rearward to raise the front caster 30 off the ground so that the weight of the receptacle will be located substantially above the casters 30 on the rear legs.

The receptacle 16 is protected from damage by means of a bumper 40 in the form of an L-bracket secured to the lower end of the front leg 26. The bumper 40 is located at a point forward of a vertical line passing through the front of the receptacle 16. As seen in FIG. 2, the bumper 40 will engage the lower face of the labeling machine 42 before the receptacle 16 when the accumulator is moved to a position to receive articles from the conveyor 12. The bumper 40 extends forwardly of the front edge of the receptacle 16 about one inch, thus to maintain this spacing of the receptacle from the face of the labeling machine to leave the receptacle free to turn. Moreover, the bumper precludes contact of the receptacle against the jamb of a door or other obstructions in its path of movement.

What is claimed is:

1. A portable rotary accumulator comprising a carriage provided with wheels, a tubular bearing housing disposed on said carriage at an angle to the vertical, said carriage including legs extending from said bearing housing and respectively carried on said wheels, a shaft rotatable in the bearing housing at said angle to the vertical, a receptacle on the shaft which, by virtue of said shaft angle from the vertical has a high side and a low side, a handle connected to two of the carriage legs and having strut means connected to the bearing housing, said handle extending at an upward inclination and being spaced from said receptacle, the low side of the receptacle being at the side toward the legs with which the handle is connected.

2. A portable rotary accumulator according to claim 1 in which the carriage has a third leg projecting beneath the high side of the receptacle and provided with a bumper disposed slightly ahead of the receptacle.

References Cited

UNITED STATES PATENTS

| | | |
|---|---|---|
| 1,898,867 | 2/1933 | Brown. |
| 1,918,604 | 7/1933 | Johnson _____ 248—129 |
| 2,531,131 | 11/1950 | Johnson _____ 248—129 |
| 2,947,548 | 8/1960 | Bard _____ 280—79.2 |
| 3,399,903 | 9/1968 | Bailey _____ 280—47.34 |

OTHER REFERENCES

Brochure (advertising matter), Wrapping Auto-Labeler Nos. 1 and 2, Wrapping Machinery Co., Franksville, Wis.

BANJAMIN HERSH, Primary Examiner

L. J. PAPERNER, Assistant Examiner

U.S. Cl. X.R.

220—69; 248—45, 129, 131